UNITED STATES PATENT OFFICE.

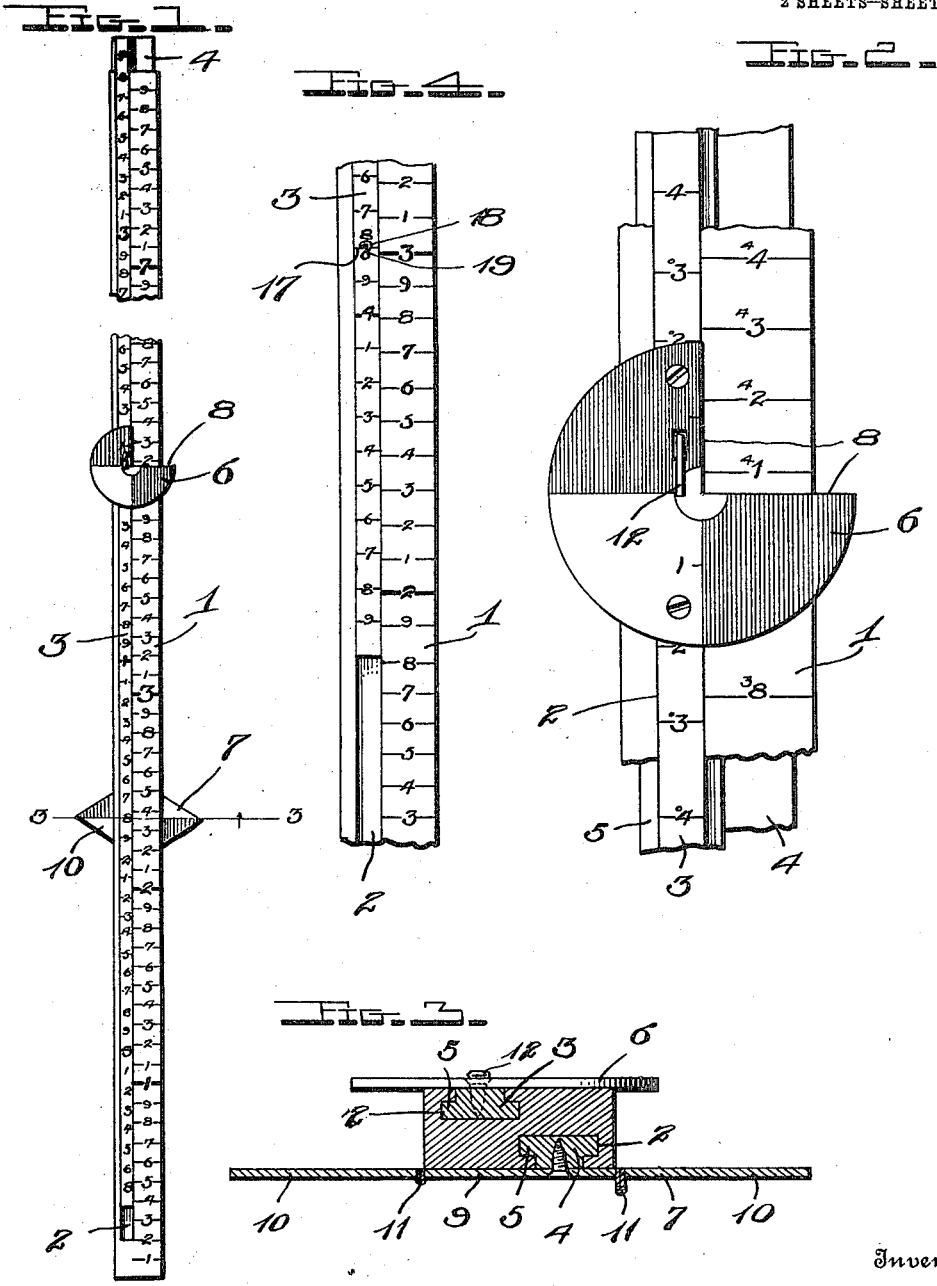

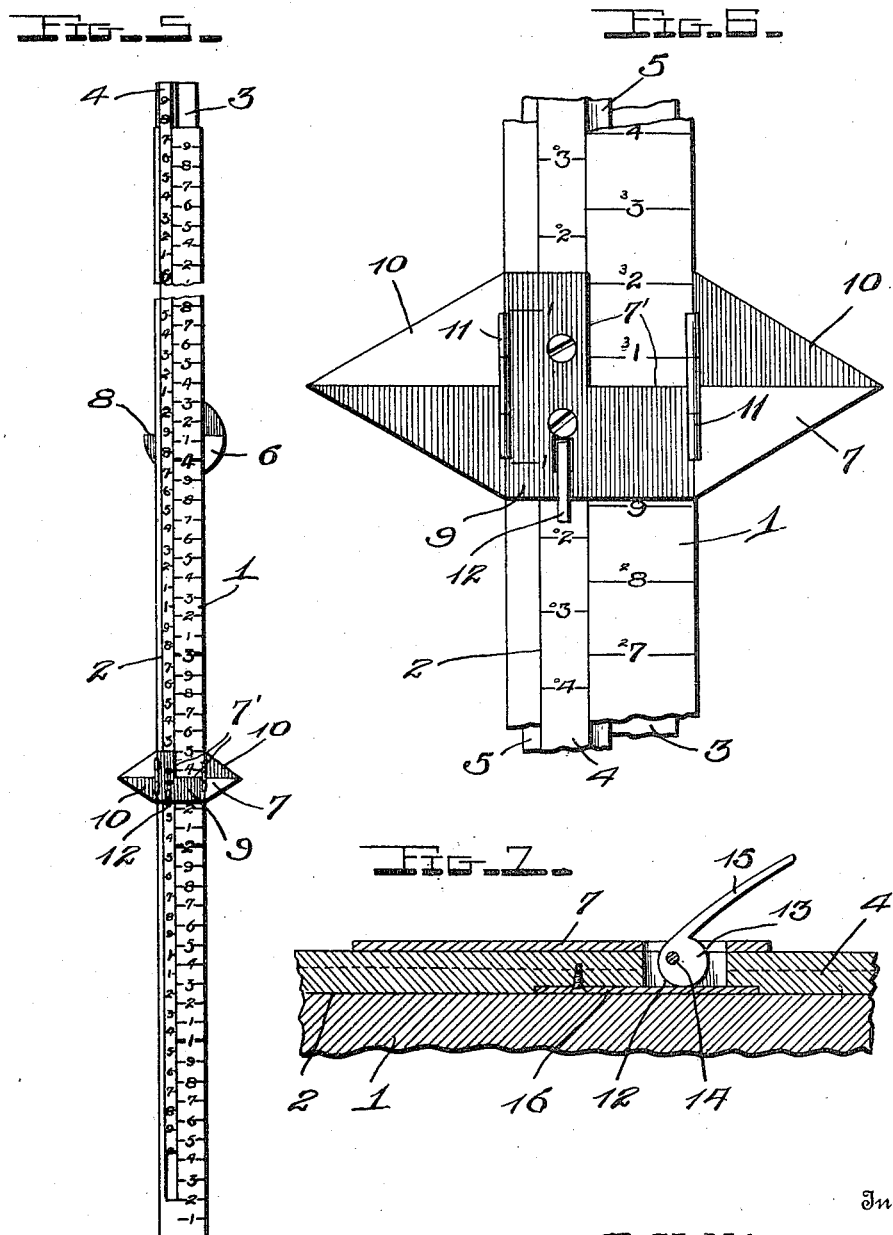

ROSS HOLLINGSWORTH, OF CANON CITY, COLORADO, ASSIGNOR OF ONE-SIXTH TO HENRY L. WHITE, ONE-SIXTH TO WILLIAM B. WHITE, AND ONE-SIXTH TO EDWIN H. STINEMEYER, ALL OF FREMONT COUNTY, COLORADO.

SURVEYOR'S ROD.

1,063,447. Specification of Letters Patent. Patented June 3, 1913.

Application filed May 15, 1912. Serial No. 697,565.

*To all whom it may concern:*

Be it known that I, ROSS HOLLINGSWORTH, a citizen of the United States, residing at Canon City, in the county of Fremont and State of Colorado, have invented certain new and useful Improvements in Surveyors' Rods, of which the following is a specification, reference being had to the accompanying drawings.

This invention comprehends certain new and useful improvements in surveying instruments or appliances and relates particularly to an improved adjustable and self-calculating grade and cross section rod.

The invention has for one of its primary objects a simple and efficient construction of device of this character, embodying a movable runner on which the target is made stationary, whereby after the target has been adjusted to the hub of the transit or level, a variation of the level or grade from an initial point or from the point where the instrument is located, may be quickly and accurately read and whereby there may be read on the runner above or below the target, as the rise or depression of the ground may render necessary, the exact number of feet or fractions thereof in tenths or graduations of multiples of tenths, the amount of rise or depression between the location of the rod and the instrument.

The invention has for another main object an improved surveyor's rod, the parts of which are so constructed and arranged that the reading taken at any point on the runner will indicate the differences in grade from the transit or level without deducting the reading from the position of the target on the rod proper, thereby making it possible to take readings with a greater degree of accuracy and rapidity and absolutely without possibility of errors.

A still further object of the invention is a device of this character in which there is embodied a movable rear runner and a target secured fixedly thereto, which will render it possible to cross section a line of center stakes at the same time the center stakes are graded.

The invention has for another object a device of this type embodying front and rear movable runners and targets carried by the respective runners, one of said targets being so constructed that, when only one side of the rod is in use, the wings of such target may be folded out of the line of vision and the runner lowered wholly within the rod proper and locked.

The invention has for a still further object a surveying accessory of the character described, which is so constructed that part of both runners extending below the target may, if desired, be made in different lengths, longer or shorter, as may be made necessary by the existing conditions, whereby when it is necessary to read grades a greater distance below the target or to locate the target at a low point in the runner groove, portions of that part of the runner below the target may be added or taken out, according to the particular requirements of the case, it being understood that several extra runner sections are furnished for that purpose. And the invention also aims to generally improve devices of this class and to render them more useful and commercially desirable.

With these and other objects in view, as will more fully appear as the description proceeds, the invention consists in certain constructions, arrangements and combinations of the parts that I shall hereinafter fully describe and claim.

For a full understanding of the invention, reference is to be had to the following description and accompanying drawing, in which, Figure 1 is a front elevation of a surveyor's rod constructed in accordance with my invention, the device being shown partly broken away, in order to economize space. Fig. 2 is a fragmentary front elevation on an enlarged scale. Fig. 3 is a horizontal sectional view on the line 3—3, of Fig. 1, looking upward or in the direction of the arrow. Fig. 4 is a fragmentary elevation illustrating the manner in which extension sections may be secured to the runners, as will be hereinafter more specifically described. Fig. 5 is a rear elevation partly broken away. Fig. 6 is a fragmentary rear elevation on an enlarged scale to show particularly the rear target, and, Fig. 7 is a sectional view illustrating one of the latches that are used to lock the runners in their adjusted position.

Corresponding and like parts are referred to in the following description and designated in the accompanying drawing by like reference characters.

Referring to the drawing, the numeral 1 designates the rod proper which may be constructed of wood, pressed steel, or any other light weight material and which may be made in any required length or in sections hinged together. The rod 1 is formed on its opposite faces with longitudinally extending grooves which are disposed in offset relation to each other, as best illustrated in Fig. 3 and which are formed with undercut side walls. These grooves 2 are designed, respectively, to accommodate a movable front runner 3 and a movable rear runner 4, each of said runners being formed on its side edges with longitudinal ribs or flanges 5 fitting within the undercut side walls of the grooves.

The face and rear side of the rod 1 are provided with graduations scaled in feet, tenths and its multiples beginning at the lower end and graduated consecutively to the top. Each runner has secured thereto intermediate of its ends, a target, the front target being designated 6 and the rear target being designated 7, the targets being secured in fixed relation to their respective runners by screws or similar fastening devices, as shown. The outer faces of the movable runners 3 and 4 are likewise scaled in feet, tenths and their multiples beginning at the center of the target and graduated consecutively to the top and to the bottom ends of the runners.

The front target 6 is in the form of a disk with a sector shaped opening cut therefrom to define vertical and horizontal sighting edges 8 and is preferably divided, as is customary, into a plurality of contrasting sector shaped panels. The rear target 7 comprises a body section 9 which is preferably rectangular and preferably tapering side wings 10 which are hingedly connected to the side edges of the body section 9, as indicated at 11, whereby the wings may be swung outwardly so as to project laterally from the rear side of the rod, or when not required for use, may be folded back upon themselves and the body section 9 and secured in their inoperative positions by any desired means. Preferably, the rear target 7 is also divided into a plurality of panels of contrasting color so as to assist the operator in obtaining the sight and also is, like the front target, formed with a sector shaped opening cut therefrom to define vertical and horizontal sighting edges 7'.

In order to secure the movable runners 3 and 4 at the required elevation relative to the rod 1, each of said runners is provided with a latch 12. Each of these latches is formed with a cam head 13 fulcrumed in the runner, as at 14, and a handle 15 by which the latch may be easily manipulated. The cam head 13 of the latch 12 is designed to bear against a strip 16 of spring steel having one end attached to the back of the runner and the whole length of the strip being countersunk flush with the back of the runner, whereby when the latch is pressed to its operative locking position, the eccentric head will prevent all tendency of the runner moving up or down during the operation of clamping the runner in any desired position. Either of the runners may be cut at any predetermined point below its target, and there may be secured thereto, extension sections 17 as by hooks 18 and keeper studs 19, whereby it is possible to raise or lower the target to a more extended degree of height or depth, as required.

From the foregoing description in connection with the accompanying drawing, the operation of my improved adjustable and self-reading grade and cross section rod will be apparent. In the practical use of the device, in the operation of grading, it is obvious that when the front movable runner 3, to which the target is fixedly connected, is adjusted so that the target will be in line with the hub of the transit or level, the variation of the level or grade from an initial point may be easily read and as the reading taken at any point on the runner indicates the difference in grade from the instrument without deducting the reading from the position of the target on the rod proper, it is possible to take readings with a greater degree of accuracy and rapidity and without possibility of an error. The equipment on the back of the rod renders it possible to cross section a line of center stakes at the same time the center stakes are graded. The target on the front face of the rod being adjusted to the hub or transit or of the level, the line of center stakes are graded, as above indicated, and as each center stake is graded, the target on the rear face of the rod is to be adjusted to the grade reading of that particular center stake. The engineer is able to locate the rear target by the projecting wings on either side. When the rear target is adjusted to the center stake hub or to the instrument level for that individual stake, the rodman will then hold his rod on one of the cross section or side stakes, turning the rod so that the rear face will be toward the engineer, whereupon the engineer can read on the cross section or rear runner, the exact cut or fill from the center stake, without additions or deductions from his hub, as is necessary with the rods heretofore employed.

If it is desired to grade a series of cross section stakes at the same time the center stakes are graded and if the grade to be determined, both for centers and cross sections, is entirely uniform or universal, it is unnecessary to bring the rear target and runner into action, but if the grade to be established is not entirely universal and if either the various center or cross section stakes are not a direct variation from the initial, the rear target and runner would be brought into action, provided it were not desirable to move the instrument nor to disturb the located front target. For example, presuming that center stake No. 1 was a certain variation from the initial stake and that the center stake No. 2 was a variation from the center stake No. 1, different from the first variation, then the procedure would be as follows: After locating the instrument over the initial stake and adjusting the front target to the hub of the instrument, the rod is held with the front face toward the instrument on the center stake No. 1 and a sight discloses the fact that there is, say, no feet and seven-tenths fall from the initial stake to the center stake No. 1. Then, the rod-man after unfolding the wings of the rear target, will bring that target into a line with the instrument vision on the front face reading no feet, seven-tenths above the front target and lock it in that position. The rod is then taken to the center stake No. 2 and held with the rear face toward the instrument and a sight gives the reading on the rear runner of three and one-tenth feet below the target which, without mathematical calculation, is the variation from the center stake No. 1 to the center stake No. 2. Reversing the face of the rod shows a reading of two and four-tenths feet below the front target which, without having interfered with the hub of either the initial or the hub of the No. 1 center stake, discloses, without mathematical calculation, that the variation from the initial to the center stake No. 2 is two and four-tenths feet. Thus, when any or all cross section stakes are relative to their respective center stakes and are not in the same way relative to the initial stake or to the position of the instrument from which the initial hub was taken, the rear target and runner come into action, as above indicated.

While the accompanying drawing illustrates what I believe to be the preferred embodiment of my invention, it is to be understood that the invention is not limited thereto, but that various changes may be made in the construction, arrangement and proportions of the parts without departing from the scope of the invention, as defined in the appended claims.

What I claim is:—

1. A device of the character described, including a rod proper, the opposite faces of said rod displaying a scale, front and rear movable runners mounted on opposite faces of said rod and also provided with scales, and targets carried by the respective runners, the scales of the rod coöperating with the respective targets for indicating the elevations, and the scales of the runners indicating the differences of the elevations.

2. A device of the character described, including a rod proper, the opposite faces of said rod displaying a scale, front and rear movable runners mounted on opposite faces of said rod and also provided with scales, and targets carried by the respective runners, the scales of the rod coöperating with the respective targets for indicating the elevations, and the scales of the runners indicating the differences of the elevations, one of said targets being provided with laterally projecting wings, said wings being hingedly mounted whereby they may be folded back out of line of vision.

In testimony whereof I hereunto affix my signature in the presence of two witnesses.

ROSS HOLLINGSWORTH.

Witnesses:
CHARLES H. BALDWIN,
SAMUEL B. DYER.